United States Patent [19]

Wahlstedt et al.

[11] Patent Number: 5,771,539
[45] Date of Patent: Jun. 30, 1998

[54] TORSION FRICTION SPRING HINGE

[75] Inventors: David Wahlstedt; Xiangmin Zhou, both of Minneapolis, Minn.

[73] Assignee: Reell Precision Manufacturing Corporation, St. Paul, Minn.

[21] Appl. No.: 714,939

[22] Filed: Sep. 17, 1996

[51] Int. Cl.[6] .............................. E05F 1/14; E05C 17/64
[52] U.S. Cl. ............................................ 16/285; 16/342
[58] Field of Search ............................ 16/285, 342, 337, 16/277, 278, 338, 341; 188/83; 296/97.12, 97.13

[56] References Cited

U.S. PATENT DOCUMENTS

| | | | |
|---|---|---|---|
| 3,030,783 | 4/1962 | Schmidt | 64/15 |
| 3,395,553 | 8/1968 | Stout | 64/15 |
| 4,423,535 | 1/1984 | Ojima et al. | 16/85 |
| 5,010,983 | 4/1991 | Kitamura | 188/67 |
| 5,018,244 | 5/1991 | Hino | 16/342 |
| 5,037,231 | 8/1991 | Kitamura | 403/120 |
| 5,041,818 | 8/1991 | Liu | 340/700 |
| 5,043,846 | 8/1991 | Kinoshita | 361/394 |
| 5,052,078 | 10/1991 | Hosoi | 16/297 |
| 5,064,137 | 11/1991 | Komatsu | 242/201 |
| 5,079,799 | 1/1992 | Rude et al. | 16/342 |
| 5,088,156 | 2/1992 | Hosoi | 16/342 |
| 5,195,213 | 3/1993 | Ohgami et al. | 16/342 |
| 5,197,704 | 3/1993 | Kitamura | 248/292.1 |
| 5,211,368 | 5/1993 | Kitamura | 248/292.1 |
| 5,231,734 | 8/1993 | Rude | 16/342 |
| 5,354,028 | 10/1994 | Kitamura | 248/292.1 |
| 5,394,650 | 3/1995 | Dean | 49/386 |
| 5,467,504 | 11/1995 | Yang | 16/342 |
| 5,542,505 | 8/1996 | Kempf | 16/342 |
| 5,564,163 | 10/1996 | Lowry et al. | 16/342 |

OTHER PUBLICATIONS

Joseph Kaplan, "Slip Clutches and Brakes," *Machine Design*, Jan. 22, 1959, pp. 115–117.
Joseph Kaplan, "Spring Clutches," *Machine Design*, Apr. 19, 1956, pp. 107–111.

*Primary Examiner*—Chuck Mah
*Attorney, Agent, or Firm*—Kinney & Lange, P.A.

[57] ABSTRACT

The present invention is a spring hinge for generating torque. The spring hinge includes a shaft and a single helical element. The shaft has a surface with an outer diameter and is capable of rotation. The single helical element is wrapped about the shaft. The helical element includes a first end and a second end. The helical element produces a variable torque between the first and second ends.

20 Claims, 6 Drawing Sheets

TORSION FRICTION SPRING HINGE

REFERENCE TO CO-PENDING APPLICATION

Reference is hereby made to the following commonly assigned, co-pending application entitled CLIP FRICTION HINGE (Ser. No. 08/563,218) filed on Nov. 27, 1995 now pending.

BACKGROUND OF THE INVENTION

The present invention relates to spring hinges for generating torque. More specifically, the present invention relates to a hinge element which is utilized to produce a variable torque force, the variable torque comprising a variable spring torque component and a variable friction torque component.

Torque-generating hinges are used to support objects at selected angular positions relative to a main body. For example, torque-producing hinges are used in notebook computers to support a computer screen at various angular positions relative to a computer base.

One type of hinge for generating torque is a friction torque hinge. A friction torque hinge utilizes a helical spring wrapped around a shaft. In a relaxed state, the spring has an inner diameter less than the outer diameter of the shaft to frictionally engage the shaft so that the spring and shaft tend to rotate together. In use, the shaft is connected to a rotatable body. As the rotatable body and the shaft are rotated, the spring, which is frictionally engaged to the shaft, will tend to rotate with it. However, one of the spring ends or "toes" is oriented to contact a stop, which is typically part of a stationary support. The engagement of the spring toe with the stop will cause the spring to slip, relative to the shaft, rather than rotate with the shaft. This will generate resistance to rotation or friction torque. Such a friction torque hinge can be designed to provide a fairly constant torque over a given range of rotation.

However, a friction torque hinge has several limitations. A friction torque hinge only provides resistance to rotation, it does not provide assistance to rotation. In many applications it is desirable for a hinge to supply assistance to rotation in a certain range of motion and resistance to rotation in another range of motion. A friction torque hinge cannot provide these performance characteristics.

Also, a friction torque hinge as described above provides a relatively constant resistance over a limited range of rotation. In some applications it is desirable to have variable resistance to rotation over a particular range of rotation.

Another type of torque-producing hinge is a spring torque hinge. One end of the spring in a spring torque hinge is connected to a rotatable member and the other end of the spring is connected to a fixed base. The stored energy of the spring rotates, or assists in the rotation of, the rotatable member relative to the stationary base.

However, a spring torque hinge cannot provide the required resistance to rotation that is often necessary in many applications. Also, in order to supply both assistance and resistance to rotation over certain ranges, previous hinges have required multiple helical devices. This complicates design consideration, increases unit size, and increases expense.

Also, previous hinge designs that supply both assistance and resistance to rotation over certain ranges do not allow for one of these forces to be cut off in certain ranges of rotation.

The present invention solves these and other problems associated with the prior art.

SUMMARY OF THE INVENTION

The present invention is a torque-producing device for producing variable torque. The torque-producing device includes a rotatable shaft and a unitary helical device. The unitary helical device is wrapped around the shaft. The helical device includes a first end, a second end, a torsion portion, and a friction portion. The first end of the helical device engages the shaft. The torsion portion of the helical device produces a variable spring torque. The variable spring torque is at least partially based on the relative angular position of the first and second ends. Similarly, the friction portion produces a friction torque. The friction torque is varied by the variable spring torque.

In a preferred embodiment, the torque-producing device also includes a first and a second hinged element. The first end of the helical device is engaged with the first hinged element and the second end of the helical device is engaged with the second hinged element. Further, the first hinged element is a computer base and the second hinged element is a computer screen. The torque-producing device causes the screen to pop up from the base when the screen is released from a closed position. The torque-producing device also includes torque that holds the screen steady at various angular positions between the closed position and an open position.

DETAILED DESCRIPTION OF THE PREFERRED EMBODIMENTS

Figure 1:
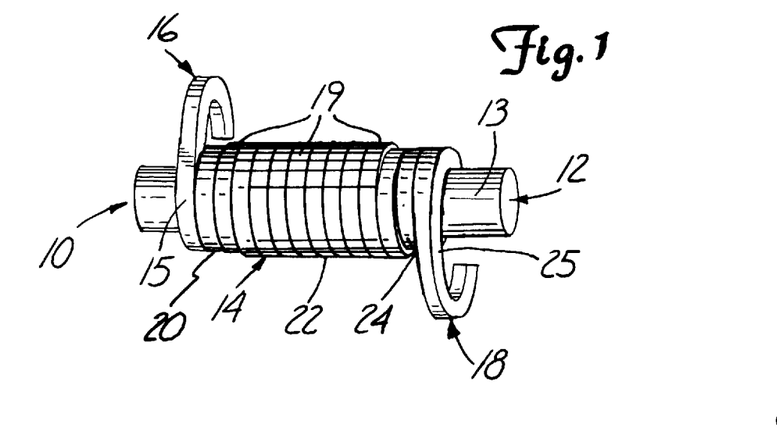
FIG. 1 is a spring torque and friction torque hinge in accordance with the present invention.
Figure 2:
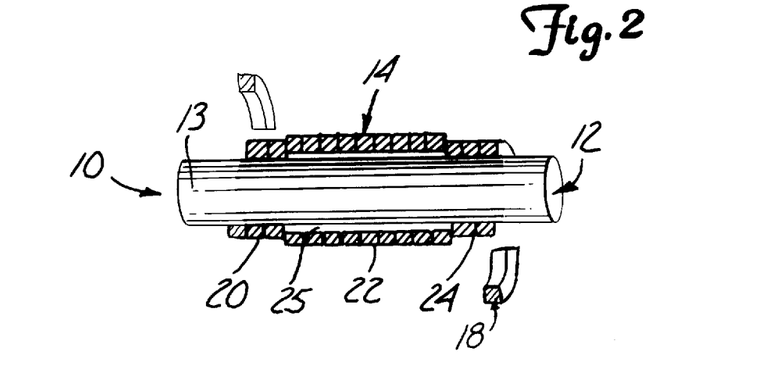
FIG. 2 is a sectional view of a spring torque and friction torque hinge in accordance with the present invention.
Figure 3:
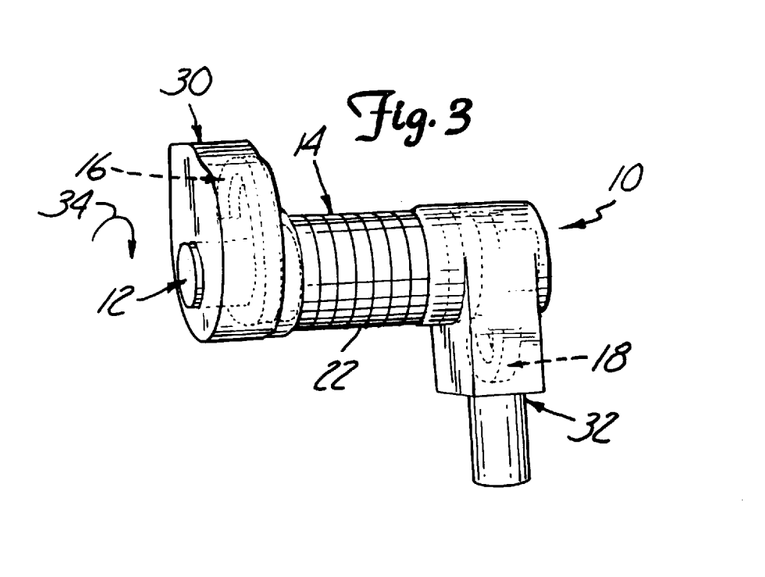
FIG. 3 is an overmolded spring torque and friction torque hinge in accordance with the present invention.

FIGS. 1–3 show a combined spring torque and friction torque hinge 10 in accordance with the present invention. Hinge 10 includes shaft 12 and helical element 14. Shaft 12 includes outer shaft surface 13. Helical element 14 is wrapped about outer shaft surface 13 of shaft 12.

Helical element 14 has first end 16 and second end 18 and includes first, second, and third portions 20, 22 and 24, each of which consist of a plurality of wraps 19. Helical element 14 is a flat-wound spring that includes outer element surface 15 and inner element surface 25. Portions 20, 22, and 24 are wrapped such that when helical element 14 is in its relaxed state, the diameter of inner element surface 25 in first and third portions 20 and 24 is reduced so that portions 20 and 24 engage outer shaft surface 13 in an interference fit. The diameter of inner element surface 25 in second portion 22 is larger than outer shaft surface 13 so that second portion 22 does not engage shaft 12, and inner element surface 25 is spaced apart from outer shaft surface 13 in second portion 22.

In a preferred embodiment, first portion 20 includes two wraps 19 about shaft 12, second portion 22 includes nine wraps 19 about shaft 12, and third portion 24 includes three wraps 19 about shaft 12. In this way, third portion 24 has more wraps 19 than does first portion 20. Consequently, third portion 24 will tend to grip shaft 12, while first portion 20 will tend to slip relative to shaft 12 as first and second ends 16 and 18 are rotated relative to each other. The slipping of first portion 20 on shaft 12 and first and second ends 16 and 18 are rotated causes a friction torque in hinge 10.

The actual number of wraps 19 may be varied and still achieve the objects of the present invention. In fact, hinge 10 will function even where first and third portions 20 and 24 have the same number of wraps 19. However, in order to more easily predict which portion will slip relative to shaft 12 and which will grip shaft 12, the number of wraps 19 in the first and third portions 20 and 24 may differ so that the portion with more wraps 19 grips shaft 12 while the other portion slips relative to shaft 12.

Another way to ensure that one of portions 20 and 24 grips shaft 12 while the other slips relative to shaft 12 as first and second ends 16 and 18 are rotated relative to each other, is to increase the interference between one of the portions and shaft 12 while the interference between the other portion and shaft 12 is kept the same. Increased interference in a portion may be achieved by wrapping the portion of helical element 14 tighter before it is placed over shaft 12. The portion with more interference will tend to grip shaft 12 while the portion with less interference will tend to slip relative to shaft 12. This method could also be used in conjunction with altering the number of wraps.

FIG. 3 shows combined spring torque and friction torque hinge 10 overmolded with first and second housings 30 and 32. Housings 30 and 32 may be formed over hinge 10 in a variety of methods, including an injection molding process. In one preferred embodiment the first and second housings 30 and 32 are made of nylon 6/6 30–40% fiberglass.

First housing 30 encloses first end 16 and also first portion 20 of helical element 14. Second housing 32 encloses second end 18 and also third portion 24 of helical element 14. Second portion 22 is not enclosed by first or second housing 30 and 32. Housings 30 and 32 engage outer element surface 15 of first and third portions 20 and 24 to prevent expansion thereof. Thus, first and third portions 20 and 24 are not allowed to lift off of shaft 12 and remain in contact therewith throughout the operation of hinge 10. Neither housing 30 or 32 are fixed to, or otherwise engaged with, shaft 12.

In operation, combined spring torque and friction torque hinge 10 creates torque by rotating first housing 30, and thus first end 16, in a direction indicated by arrow 34 of FIG. 3 while second housing 32, and thus second end 18, is held stable. As first housing 30 is rotated in the direction indicated by arrow 34 while second housing 32 is held stable, second portion 22 will wrap open, that is, move away from shaft 12. Further, because neither first or second housing 30 and 32 engages outer element surface 15 at second portion 22, second portion 22 will wrap open through the entire range of angular positions between housings 30 and 32 as first housing 30 is rotated in the direction indicated by arrow 34. Consequently, a spring torque potential is built up in second portion 22 as first housing 30 is rotated in the direction indicated by arrow 34.

As first housing 30 is rotated in the direction indicated by arrow 34 while second housing 32 is held stable, the spring torque potential in second portion 22 affects first portion 20 of helical element 14 such that first portion 20 gradually begins to reduce pressure on shaft 12. Thus, the friction torque of hinge 10 caused by the interference between outer shaft surface 13 and inner element surface 25 decreases as first housing 30 is rotated in the direction indicated by arrow 34 and second housing 32 is held stable. This variance in friction torque is due to the spring torque in second portion 22. Eventually, as first housing 30 is rotated far enough in the direction indicated by arrow 34 while second housing 32 is held stable, the pressure on shaft 12 is reduced such that there is virtually no friction torque between first portion 20 and shaft 12, and thus, virtually no friction torque in hinge 10.

As first housing 30 is rotated in the direction indicated by arrow 34, third portion 24 will also gradually reduce pressure on shaft 12 in a manner similar to first portion 20. The friction between outer shaft surface 13 and inner element surface 25 decreases as first housing 30 is rotated in the direction indicated by arrow 34. Similar to first portion 20, as first housing 30 is rotated far enough in the direction indicated by arrow 34 while second housing 32 is held stable, eventually there will be virtually no friction torque between third portion 24 and shaft 12. Because third portion 24 has more wraps 19 than does first portion 20 (3:2), however, the point where there is virtually no friction between helical element 14 and shaft 12 will occur in first portion 20 before it occurs in third portion 24. In this way, third portion 24 will tend to grip shaft 12 as first housing 30 is rotated in the direction indicated by arrow 34. First portion 20 slips relative to shaft 12 producing the friction torque.

Again, the number of wraps 19 can be altered, as can the amount of interference between first and second portions 20 and 24 with the shaft, so that either portion can be designed to reach virtually no friction while the other grips and rotates with shaft 12.

As first housing 30, and thus first end 16, is rotated in a direction opposite that indicated by arrow 34, second portion 22 of helical element 14 wraps down, that is, moves toward shaft 12. But second portion 22 does not wrap down to the extent that inner element surface 25 contacts outer shaft surface 13.

As first housing 30 is rotated in a direction opposite that indicated by arrow 34, the stored spring torque in second portion 22 will act upon first portion 20. Thus, the interference between both first portion 20 and third portion 24 with shaft 12 will gradually increase due to the stored spring torque in second portion 22. Again, because third portion 24 has more wraps 19 than does first portion 20, third portion 24 will tend to grip shaft 12 and hold it stable relative to third portion 24. The increased interference caused between first portion 20 with shaft 12 will variably increase the overall friction torque of hinge 10. This variable friction torque is essential in the operation of hinge 10.

The operation of combined spring torque and friction torque hinge 10 can also be explained by rotating second housing 32 relative to first housing 30, as first housing 30 is held stable. However, the explanation is symmetrical and the forces on, and caused by, portions 20, 22, and 24 are the same.

Figure 2A:
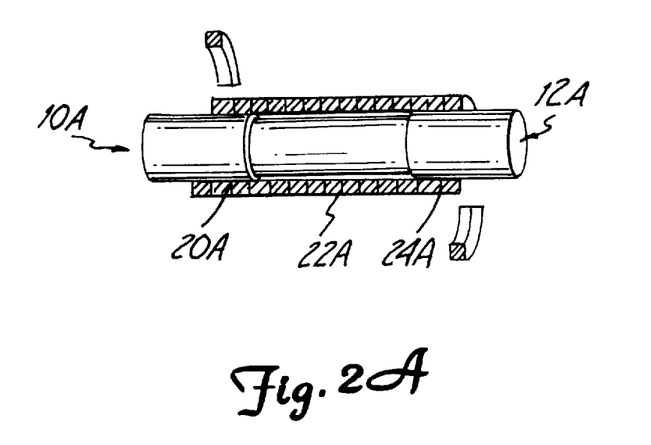
FIG. 2A is an alternative spring torque and friction torque hinge in accordance with the present invention.

Furthermore, the same effect as in hinge 10 can be achieved using a helical element with a constant diameter in first, second, and third portions while using a multi-diameter shaft. The shaft 12A has larger diameters on the outer portions proximate to the first and third helical portions 20A and 24A. The shaft 12A has a smaller diameter in the center portion proximate to the second portion 22A. Thus, the interference fit between the first and third portions 20A and 24A with the shaft 12A are retained, as is the clearance between the second portion 22A and that shaft 12A. The same performance characteristics as in hinge 10 will be achieved.

Also, the spring torque produced in hinge 10 could also be produced by a long straight torsion bar instead of a helical portion as described. One end of the torsion bar would be connected to the friction portion and the other end to a housing. In this way, the torsion bar would produce the variable spring torque that will act on and affect the friction torque.

Figures 4, 5:
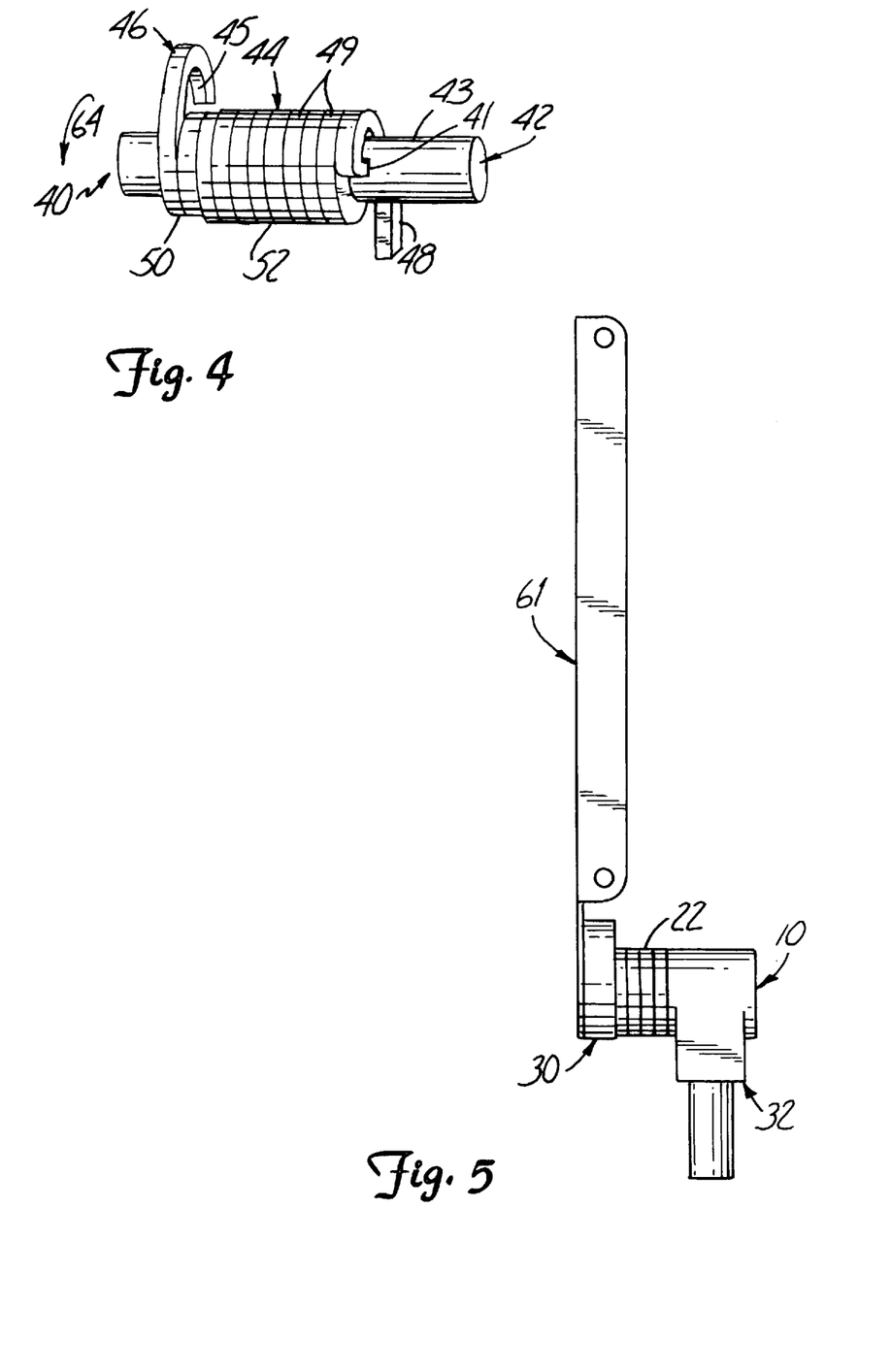
FIG. 4 is an alternative spring torque and friction torque hinge in accordance with the present invention.
FIG. 5 is an overmolded spring torque and friction torque hinge with a connecting bracket in accordance with the present invention.

FIG. 4 shows a combined spring torque and friction torque hinge 40 in accordance with the present invention. Hinge 40 includes shaft 42 and helical element 44. Shaft 42 includes outer shaft surface 43 and opening 41. Helical element 44 has first end 46 and second end 48 and includes first, second, and third portions 50, 52 and 54, each of which consist of wraps 49.

Helical element 44 is wrapped about outer shaft surface 43 of shaft 42, and second end 48 is fed through opening 41 so that third portion 54 is positioned in opening 41 of shaft 42. Helical element 44 is a flat-wound spring with an inner element surface 45. Portions 50, and 52 are wrapped such that when helical element 44 is in its relaxed state, the diameter of inner element surface 45 in first portion 50 is reduced so it is less than the diameter of outer shaft surface 43. In this way, when shaft 42 is inserted into helical element 44, first portion 50 is deflected by shaft 42 such that there is an interference fit between first portion 50 with shaft 42. Inner element surface 45 of portion 50 is in direct contact with outer shaft surface 43. The diameter of inner element surface 45 in second portion 52 is larger than outer shaft surface 43 so that second portion 52 does not engage shaft 42. Inner element surface 45 is spaced apart from outer shaft surface 43 in second portion 52.

In operation, combined spring torque and friction torque hinge 40 is used to create torque by rotating first end 46, in a direction indicated by arrow 64 of FIG. 4, while shaft 42 is held stable. Because third portion 54 is secured on opening 41 of shaft 42, third portion 54 is also held stable. As first end 46 is rotated in the direction indicated by arrow 64, the interference between shaft 42 and first portion 50 of helical element 44 creates a friction torque in hinge 40.

As first end 46 is rotated in the direction indicated by arrow 64, second portion 52 will gradually wrap open. Second portion 52 will wrap open through the entire range of angular positions between ends 46 and 48. Consequently, a spring torque potential is built up in second portion 52 as a function of the relative rotation of first end 46 in the direction indicated by arrow 64.

As first end 46 is rotated in the direction indicated by arrow 64, third portion 54 will be held stable by shaft 42 because of its positioning in opening 41.

As first end 46 is rotated in a direction opposite that indicated by arrow 64, second portion 52 wraps down, that is, the diameter of helical element 44 in second portion 52 decreases and inner element surface 45 advances toward outer shaft surface 43 in that portion. However, second portion 52 will not wrap down sufficiently to contact shaft 42.

As first end 46 is rotated in a direction opposite that indicated by arrow 64, the stored spring torque in second portion 52 will act upon first portion 50 and will increase the interference between outer shaft surface 43 and inner element surface 45. The interference between first portion 50 and shaft 42 increases as a function of the stored spring torque in second portion 52. This increases the overall friction torque of hinge 40, which is essential to its operation.

Combined spring torque and friction torque hinge 40 can also include housings similar to those described above. One housing contains first end 46 and first portion 50, and the other housing contains second end 48 and third portion 54. These housings function substantially similarly to that described above in relation to combined spring torque and friction torque hinge 10.

As an alternative embodiment to hinge 40, longitudinal grooves (not shown) can be etched into the shaft in the location where third portion 54 is shown, in place of third portion 54. In this way, a housing (such as housing 32 in FIG. 3) can be molded directly onto the shaft, over the grooves, and the housing will drive the shaft directly via the grooves. Thus, third portion 54 will not be necessary and the shaft will rotate with the housing. The housing also contains a second end (such as second end 48 in FIG. 4) such that the alternative hinge produces essentially the same performance characteristics and described above for hinge 40.

FIG. 5 shows hinge 10 attached to mounting bracket 61. Mounting bracket 61 is useful in mounting hinge 10 in a notebook computer application. Hinge 40 could be attached in much that same way, as could alternative embodiments.

Figure 6:
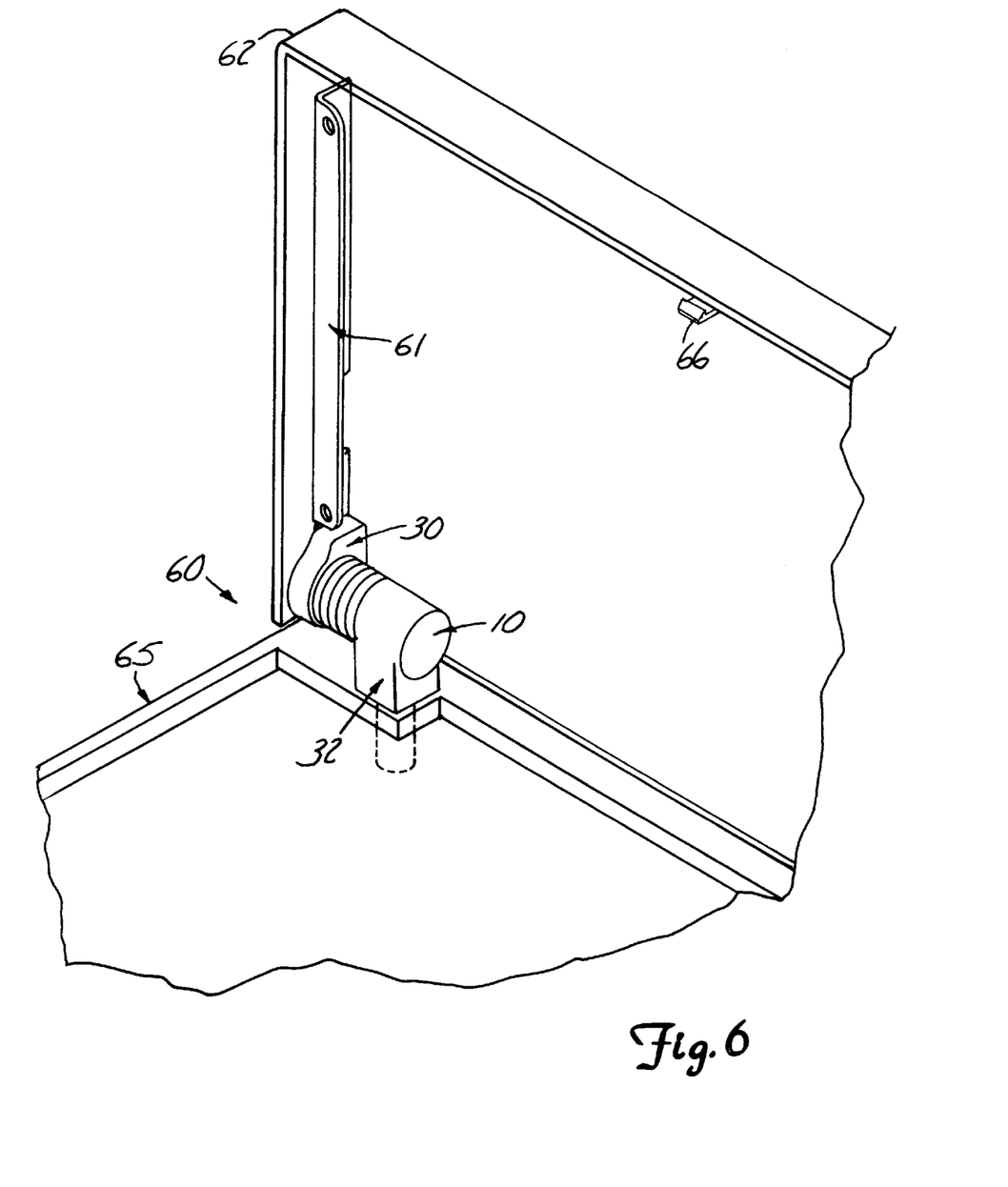
FIG. 6 is a spring torque and friction torque hinge in a notebook computer in accordance with the present invention.

FIG. 6 shows hinge 10 oriented in notebook computer 60. Notebook computer 60 includes computer screen 62, computer base 65, and latch 66. Through mounting bracket 61 and first housing 30, first end 16 is secured to computer screen 62. Through second housing 32, second end 18 is secured to computer base 65. Hinge 10 provides favorable performance characteristics for the opening and closing of computer screen 62 relative to computer base 65.

Hinge 40 can be oriented into notebook computer 60 in much the same way as hinge 10. First end 46 is secured to computer screen 62 and second end 48 (and thus shaft 42) is secured to computer base 65. Hinge 40 provides similar favorable performance characteristics for the opening and closing of computer screen 62 relative to computer base 65.

Notebook computer 60 is shown in a 90 degree position, that is, computer screen 62 is open 90 degrees relative to computer base 65. Hinge 10 allows computer screen 62 to rotate between a closed position, that is, 0 degrees between computer screen 62 and base 65, and an open position, that is, about 180 degrees between computer screen 62 and computer base 65. (For ease of reference, the relative angular position between computer screen 62 and computer base 65 will be referred to as "a 'X' degree position". For example, the aforementioned open position will be referred to as "a 180 degree position"). Hinge 10 is oriented in notebook computer 60 such that helical element 14, and specifically second portion 22, is in its relaxed state in about a 110 degree position.

In operation, a user may move computer screen 62 between a 0 degree (closed) and a 180 degree (open) position. As the user moves computer screen 62 between a 0 and 180 degree position, hinge 10 generates a friction torque and a spring torque that combine to variably aid and oppose this movement.

As computer screen 62 is moved from a 110 degree position (helical element 14 relaxed) toward a 90 degree position, hinge 10 will oppose such motion with a spring torque. Initially, that is, at or near a 110 degree position, hinge 10 will produce essentially no spring torque, because second portion 22 of helical element 14 is in its relaxed state. However, as computer screen 62 is moved toward a 90 position, hinge 10 will produce an increasing spring torque opposing the movement of computer screen 62 due to the deformation of helical element 14, and specifically second portion 22. As computer screen 62 is moved to smaller angles, second portion 22 of helical element 14 is wrapped open and this deformation of helical element 14 will produce a spring torque opposing such motion. All of this spring torque is due to second portion 22, which continues to wrap open as computer screen 62 is moved to smaller angles.

Also, as computer screen 62 is moved from a 110 degree position toward a 90 degree position, hinge 10 will oppose such motion with a friction torque. First and third portions 20 and 24 are in an interference fit with shaft 12 when helical element is in its relaxed position (110 degree position). Third portion 24 will grip shaft 12, as discussed above, and first portion 20 will slip relative to shaft 12. Consequently, first portion 20 causes friction torque between outer shaft surface 13 and inner element surface 25 as computer screen 62 is moved from a 110 degree position to a 90 degree position.

This friction torque will steadily decrease as computer screen 62 is moved toward computer base 65 due to the spring torque in second portion 22. This variable spring torque in second portion 22 acts on first portion 20 to variably decrease friction torque. Eventually, the friction torque will approach zero when computer screen 62 approaches computer base 65 (closed position).

As computer screen 62 is moved from a 90 degree position to a 0 degree position (closed), the spring torque from hinge 10 continually increases and the friction torque dissipates as described above.

Consequently, at a 110 degree position there is no spring torque and significant friction torque opposing the closing of computer screen 62; at a 90 degree position there is some spring torque and still significant friction torque opposing the closing of computer screen 62; and at a 15 degree position there is mostly spring torque and very little friction torque opposing the closing of computer screen 62.

When notebook computer 60 is in a closed position, latch 66 holds computer screen 62 immediately adjacent to computer base 65. When latch 66 releases computer screen 62, computer screen 62 will pop up, that is, the stored spring torque in hinge 10, and specifically in second portion 22, will cause computer screen 62 to move away from computer base 65. Second portion 22 of hinge 10 is in a wrap open condition when notebook computer 60 is in its closed position. Consequently, the stored spring torque of wrapped open hinge 10 causes computer screen 62 to pop up. There is virtually no friction torque in first portion 20 opposing the pop up action of computer screen 62.

In a preferred embodiment, the stored spring torque in hinge 10, in combination with the momentum generated by the weight of computer screen 62, causes computer screen 62 to pop up to approximately a 40 degree position. This is known as the "pop-up feature" of the notebook computer.

As computer screen 62 moves from a 0 degree to a 40 degree position, helical element 14 will begin to wrap down toward shaft 12 in second portion 22. As detailed above, second portion 22 will not actually contact shaft 12, but will wrap down toward shaft 12 as computer screen 62 is moved toward the open position. The stored spring torque in second portion 22 of helical element 14 will gradually decrease, yet will still assist the rotation of computer screen 62 in this region of rotation. The friction caused by the interference of first potion 20 with shaft 12 will gradually increase due to the gradual decrease in spring torque of second portion 22 that is acting upon it. Overall, hinge 10 will aid in the rotation of computer screen 62 away from computer base 65 in this region.

As computer screen 62 is moved from a 40 degree position toward a 90 degree position, the spring torque in second portion 22 continues to decrease and the friction torque in first portion 20 will continue to increase. The friction between outer shaft surface 13 and inner element surface 25 of first portion 20 will be increased because of the decreasing spring torque exerted on it by second portion 22. Thus, there is a variably increasing friction torque as computer screen 62 is moved from a 40 degree to a 90 degree position.

When computer screen 62 reaches a 90 degree position, much of the stored spring torque in helical element 14 is dissipated. Thus, most of the force of hinge 10 is a resistive friction torque from first portion 20 against shaft 12. There also continues to be some increase in friction torque of first portion 20 due to the decreasing spring torque in second portion 22.

Once computer screen 62 is rotated to a 110 degree position, second portion 22 of helical element 14 reaches its relaxed state. Therefore, there will be no spring torque assisting in the opening of computer screen 62. The friction torque between first portion 20 and shaft 12, however, continues to increase as the angle between computer screen 62 and computer base 65 increases because second portion 22 begins to wrap down on shaft 12.

As computer screen 62 is moved from a 110 degree position toward a 180 degree position (open), there continues to be increasing friction torque between first portion 20 with shaft 12 opposing such rotation. Also, a spring torque from helical element 14 begins to oppose such a rotation. The spring torque in second portion 22 of helical element 14 will continue to increase as computer screen 62 is moved to a 180 degree position.

As computer screen 62 is moved from a 180 degree position (open) back toward a 110 degree position (helical element 14 relaxed), second portion 22 of helical element 14 will again wrap open causing a decreasing friction torque opposing the motion and a decreasing spring torque assisting the motion.

Figure 7:
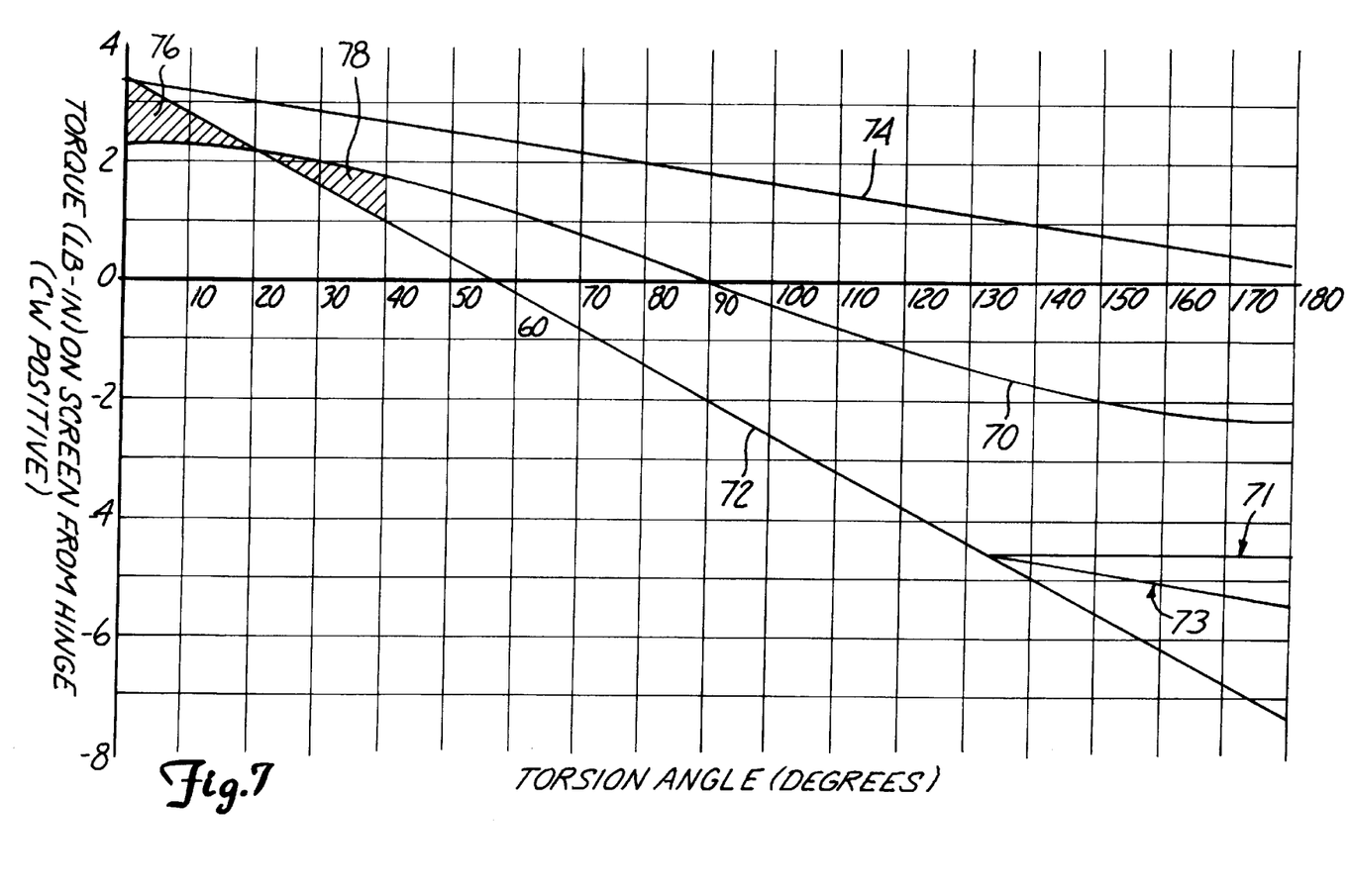
FIG. 7 is a graph relating torque to angular position.

FIG. 7 is a graph showing the relationship between the torque on computer screen 62 from hinge 10 as a function of the angle between computer screen 62 and computer base 65. Screen weight line 70 represents the torque necessary to support the weight of computer screen 62 between a 0 and a 180 degree position. Line 72 represents the actual torque on computer screen 62 from hinge 10 as computer screen 62 is moved from a 0 to a 180 degree position. Line 74 represents the actual torque on computer screen 62 from hinge 10 as computer screen 62 is moved from a 180 degree position back to a 0 degree position.

Shaded area 76 represents the energy stored in hinge 10 more than the amount necessary to support the weight of computer screen 62 (specifically in second portion 22), which then acts to cause computer screen 62 to pop up. Shaded area 78 represents the momentum effect of the energy released from hinge 10. The energy represented by shaded areas 76 and 78 are equal, that is, the energy released to create the pop up effect is the same as that dissipated by the weight of computer screen 62 and the corresponding friction. Computer screen 62 comes to rest when the two forces are equalized. Consequently, the pop up angle shown is a 40 degree position.

Lines 72 and 74 provide a good approximation of the torque of screen weight line 70. The lower portion of line 72 (that is from a 135 to a 180 degree position) however, slopes away from screen weight line 70. Consequently, a user may feel a significant increase in resistance to the moving of computer screen 62 in that range.

Figure 8:
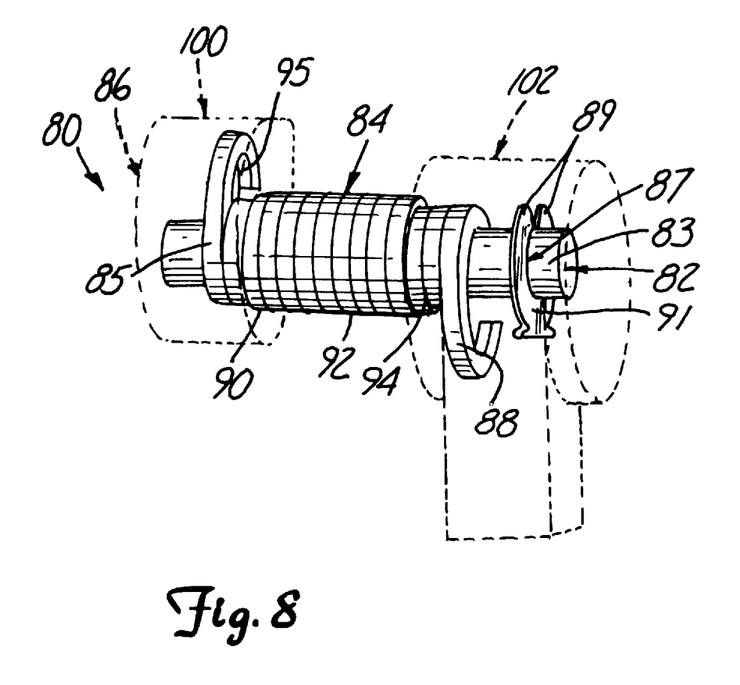
FIG. 8 is a spring torque and friction torque hinge with friction torque limitation in accordance with the present invention.

FIG. 8 shows a combined spring torque and friction torque hinge 80 with friction torque limitation in accordance with the present invention. Hinge 80 includes shaft 82, helical element 84, clip 87, first housing 100, and second housing 102. Helical element 84 has first end 86 and second end 88 and includes first, second, and third portions 90, 92 and 94. Housings 100 and 102 are shown as dashed lines for sake of clarity in explaining the hinge. Housing 100 encapsulates end 86 and first portion 90 of spring 84.

Helical element 84 is a flat-wound spring that includes outer element surface 85 and inner element surface 95. Portions 90, 92, and 94 are wrapped such that when helical element 84 is in its relaxed state, the diameter of inner element surface 95 in first portion 90 is reduced so that first portion 90 engages outer shaft surface 83 in an interference fit. The diameter of inner element surface 95 in second and third portions 92 and 94 is larger than outer shaft surface 83 so that second and third portions 92 and 94 do not engage shaft 82 and have a clearance fit over shaft 82.

Clip 87 includes arms 89 and projection 91. Clip 87 is connected over shaft 82 in an interference fit. The particular features of clip 87 are fully disclosed in co-pending application Ser. No. 08/563,218 entitled CLIP FRICTION HINGE filed Nov. 27, 1995 and assigned to the same assignee as the present invention. The description of application Ser. No. 08/563,218 is incorporated herein by reference. Clip 87 is frictionally engaged to shaft 82. As described in the application Ser. No. 08/563,218, additional clips 87 may be added to shaft 82 in order to appropriately regulate the overall interference between shaft 82 and clips 87.

Clip 87, second end 88, and third portion 94 are all encapsulated in second housing 102. Projection 91 of clip 87 and second end 88 extend into second housing 102, which is a rigid body, such that they are fixed therein and rotate uniformly with second housing 102. Clip 87 has a greater interference with shaft 82 than does first portion 90 such that shaft 82 will rotate with clip 87 and will slip relative to first portion 90 as first and second housings 100 and 102 are rotated relative to each other. The slipping of first portion 90 relative to shaft 82 produces a friction torque much the same as described above with respect to hinges 10 and 40. Spring torque is produced in second portion 92 essentially as described above with respect to hinges 10 and 40.

Clip 87, however, acts as a friction torque limitation. When a predetermined friction torque is reached, the interference between first portion 90 and shaft 82 increases beyond that between clip 87 and shaft 82 such that shaft 82 no longer rotates with clip 87. In this way, hinge 80 is designed with a friction torque limit, wherein friction torque no longer increases once a particular level is reached. Spring torque, however, continues to increase as described above in hinges 10 and 40.

Independent friction couplers other than clip 87 can also be used to perform the function of a friction torque limitation in hinge 80. For example, a wound spring could replace clip 87 in hinge 80 such that when a predetermined friction torque is reached, the interference between first portion 90 and shaft 82 increases beyond that between the wound spring and shaft 82 such that shaft 82 no longer rotates with the spring. In this way, the spring would function as a independent friction coupler in much the same way as clip 87.

Referring to FIG. 7, line 73 represents the change in torque on computer screen 62 if hinge 80 is installed in computer 60 rather than hinge 10. In one preferred embodiment clip 87 releases shaft 82 at a 135 degree position, thereby cutting off the increase in friction torque in hinge 80 at that position. Line 73 more closely follows screen weight line 70 than did line 72 in that range. The effect is that a user will not feel such a dramatic increase in resistance to opening computer screen 62 in that range of rotation.

In yet another alternative design total torque cut off can be achieved at a desired torque in applications particularly sensitive to high torque. Such applications may include protection of weak mounting points or prevention of lifting of the base in high angles of rotation in a notebook computer application.

In this alternative design, a total torque limiting device outside of hinges 10, 40, and 80 is connected between hinges 10, 40, and 80 and computer screen 62. When a particular torque is reached the total torque limiting device itself begins to slip rather than hinge 10, 40, or 80. Thus, total torque cut off will occur at that point. Referring to FIG. 7, line 71 represents such a total torque cut off.

The advantages of hinges 10, 40, and 80 include that the combination spring torque and friction torque of these hinges hold hinged elements such as computer screen 62 steady in any of the angular positions from approximately 40 to 180 degrees. A user may move computer screen 62 to any of those angular positions and it will hold steadily at that point. Finally, the user will feel a fairly constant resistance over the entire range of rotation while closing computer screen 62 (that is, from 180 to 0 degrees). Also, the user will feel a fairly constant resistance in the main functioning range of about 80 to 135 degrees while opening computer screen 62.

Also, the hinges of the present invention provide a pop up feature that many users find desirable. In a computer application, hinges 10, 40, and 80 will automatically pop the computer screen up away from the computer base. Hinges 10, 40, and 80 assist the user in moving the computer screen to a usable level.

In addition, the above-described desirable performance characteristics are attained with the use of a single helical unit. This greatly improves on the ease of design for very limited space considerations as well as reduces costs.

As described above, similar performance characteristics can be achieved using a multi-diameter shaft and a helical element with a constant diameter throughout the first, second, and third portions.

Although the present invention has been described with reference to preferred embodiments, workers skilled in the art will recognize that changes may be made in form and detail without departing from the spirit and scope of the invention.

What is claimed is:

1. A torque producing device comprising:
   a first hinged element;
   a second hinged element;
   a shaft having a surface portion; and
   a unitary helical device wrapped about the surface, the helical device having a first end coupled to the first hinged element and a second end coupled to the second hinged element, and said helical device having a first portion that frictionally engages the surface producing a friction torque as the first hinged element is rotated relative to the shaft, and a second portion that produces a variable spring torque as the first and second ends are rotated relative to one another, the variable spring torque acting on the first portion to vary the friction torque between the first portion and the surface, relative rotation of the first and second hinged elements producing a combination torque between the first and second hinged elements, said combination torque comprising the friction torque and the variable spring torque.

2. The torque producing device of claim 1, wherein the shaft surface defines an outer diameter, wherein the first portion of the helical device has a relaxed diameter such that the first portion is in an interference fit with the shaft and such that the shaft and the helical device produce the friction torque as the first end is rotated relative to the shaft, wherein the second portion of the helical device has a second portion relaxed diameter greater than the outer diameter of the shaft such that the clearance between the second portion and the shaft allows the variable spring torque to be produced as the first and second ends are rotated relative to one another, and wherein the variable spring torque produced by the second portion acts on the first portion to variably affect the friction torque produced by the first portion in at least some range of the relative rotation of the first and second ends.

3. The torque producing device of claim 2 wherein the unitary helical device further comprises a third portion in engagement with the shaft such that the third portion tends to rotate with the shaft.

4. The torque producing device of claim 3 wherein the third portion has a relaxed diameter less than the diameter of the shaft and wherein the third portion has more wraps about the shaft than does the first portion, such that the third portion grips the shaft and rotates with the shaft, while the first portion slips relative to the shaft, as the first and second ends are rotated relative to one another.

5. The torque producing device of claim 3 wherein the shaft further includes an opening and the third portion extends through the opening such that the third portion rotates with the shaft, while the first portion slips relative to the shaft, as the first and second ends are rotated relative to one another.

6. The torque producing device of claim 2 further comprising an independent friction coupler frictionally engaged over the shaft in an interference fit such that the interference between the independent friction coupler and the shaft is greater than the interference between the first portion and the shaft in a first range of relative rotation between the first end and the shaft, and such that the interference between the independent friction coupler and the shaft is less than the interference between the first portion and the shaft in a second range of relative rotation between the first end and the shaft.

7. The torque producing device of claim 6 wherein the independent friction coupler is a clip.

8. The torque producing device of claim 6 wherein the independent friction coupler is a wound spring.

9. The torque producing device of claim 2 wherein the second end of the helical device is coupled to the shaft, and wherein both the second end and the shaft are coupled to the second hinged element.

10. The torque producing device of claim 9 wherein the first hinged element is a base and the second hinged element is a movable member and wherein the torque producing device causes the movable member to pop up from the base when the movable member is released from a closed position with respect to the base, and wherein the torque producing device provides a variable torque that retains the movable member at various angular positions between the closed position and an open position.

11. The torque producing device of claim 10 wherein the spring torque of the second portion causes the movable member to pop up from the base and wherein friction torque of the first portion is negligible as the movable member pops up.

12. The torque producing device of claim 1, wherein the first and second portions of the helical device have substantially equal relaxed diameters and the shaft has a first and a second diameter, wherein the first diameter of the shaft is larger than the second diameter of the shaft, wherein the first portion of the helical device is proximate to the first diameter of the shaft, and wherein the second portion of the helical device is proximate to the second diameter of the shaft.

13. The torque producing device of claim 12, wherein the first diameter of the shaft is larger than the diameter of the first portion when the helical device is in a relaxed state such that interference between the first portion and the shaft produces the friction torque as the first end is rotated relative to the shaft, wherein the second diameter of the shaft is smaller than the diameter of the second portion when the helical device is in a relaxed state such that the clearance between the second portion and the shaft allows the variable spring torque to be produced as the first and second ends are rotated relative to one another, and wherein the variable spring torque produced by the second portion acts on the first portion to variably affect the friction torque produced by the first portion in at least some point of the relative rotation of the first and second ends.

14. A torque hinge comprising:
a first hinged element;
a second hinged element;
a shaft with a surface having an outer diameter and capable of rotation; and
a helical element wrapped about the shaft, the helical element including a friction torque portion and a spring torque portion;
the friction torque portion having a first and a second end, the first end of the friction torque portion connected to the first hinged element; and
the spring torque portion having a first and a second end, the first end of the spring torque portion being coupled to the second end of the friction torque portion and the second end of the spring torque portion being coupled to the shaft, wherein the friction torque portion produces a friction torque as the first end of the friction torque portion is rotated relative to the shaft, wherein the spring torque portion produces a variable spring torque as the first end of the friction torque portion is rotated relative to the second end of the spring torque portion, the variable spring torque acting on and alternatively increasing and/or decreasing the friction torque, and wherein relative rotation of the first and second hinged elements produces a combination torque between the first and second hinged elements comprising the friction torque and the variable spring torque.

15. The torque hinge of claim 14 wherein the spring torque element comprises a coil wrapped about the shaft.

16. The torque hinge of claim 14 wherein both the second end of the spring torque portion and the shaft are coupled to the second hinged element.

17. The torque hinge of claim 14 wherein the friction torque portion is wrapped about the shaft in an interference fit and wherein the spring torque portion is wrapped about the shaft with clearance between the shaft and the spring torque portion.

18. The torque hinge of claim 14 wherein the spring torque portion provides the variable spring torque to the second end of the friction torque portion thereby alternately tightening and loosening the friction torque portion.

19. A torque producing device comprising:

a shaft having a surface portion;

a unitary helical device wrapped about the surface, the helical device having a first end and a second end, and having a first portion that, through at least some range of rotation, frictionally engages the surface in an interference fit producing a friction torque as the first end is rotated relative to the shaft, and a second portion that produces a variable spring torque as the first and second ends are rotated relative to one another, the variable spring torque acting on the first portion to vary the friction torque between the first portion and the surface, and wherein the friction torque and variable spring torque combine to form a combination torque between the first and second ends; and a clip coupled to the unitary helical device and frictionally engaged to the shaft in an interference fit such that the interference between the clip and the shaft is greater than the interference between the first portion and the shaft in a first range of relative rotation between the first end and the shaft, and such that the interference between the clip and the shaft is less than the interference between the first portion and the shaft in a second range of relative rotation between the first end and the shaft.

20. A torque producing device comprising:

a shaft having a surface portion;

a unitary helical device wrapped about the surface, the helical device having a first end and a second end, and having a first portion that, through at least some range of rotation, frictionally engages the surface producing a friction torque as the first end is rotated relative to the shaft, and a second portion that produces a variable spring torque as the first and second ends are rotated relative to one another, the variable spring torque acting on the first portion to vary the friction torque between the first portion and the surface;

a first hinged element connected to the first end of the helical device;

a second hinged element connected to the shaft and the second end of the helical device; and the first and second hinged elements capable of relative rotation about the shaft wherein the variable spring torque of the second portion causes the first hinged element to rotate relative to the second hinged element over a range of rotation while the friction torque of the first portion is negligible over the range of rotation, and wherein relative rotation of the first and second hinged elements produces a combination torque between the first and second hinged elements comprising the friction torque and the variable spring torque.

* * * * *